3,791,978
PROCESS OF PREVENTING SCALE AND DEPOSIT FORMATION IN AQUEOUS SYSTEMS AND COMPOSITIONS
Friedrich Krueger, Edingen, and Lieselotte Bauer, Bad Duerkheim, Germany, assignors to Joh. A. Benckiser GmbH, Chemische Fabrik, Ludwigshafen am Rhine, Germany
No Drawing. Continuation-in-part of abandoned application Ser. No. 36,403, May 11, 1970. This application Nov. 17, 1971, Ser. No. 199,792
Claims priority, application Germany, Nov. 20, 1970, P 20 57 008.5
Int. Cl. C02c 5/06
U.S. Cl. 252—180          12 Claims

ABSTRACT OF THE DISCLOSURE

Scale formation as well as deposition of incrustations in aqueous systems are prevented by the addition of a composition containing starch degradation products and phosphonic acids, preferably in substoichiometric amounts calculated for the scale and hardness causing compounds present in aqueous systems. Acrylic acid and/or methacrylic acid polymers or copolymers with polymerizable ethylenically unsaturated compounds may also be added.

CROSS-REFERENCE TO RELATED APPLICATION

The present application is a continuation-in-part of copending application Ser. No. 36,403, filed May 11, 1970, and entitled "Process of Preventing Scale Formation in Aqueous Systems, and Product," now abandoned.

BACKGROUND OF THE INVENTION

(1) Field of the invention

The present invention relates to an improved process of preventing scale and deposit formation in aqueous systems and more particularly to a process of preventing such scale and deposit formation in aqueous systems by means of compositions containing starch degradation products and phosphonic acids, which are added in small amounts to the aqueous system, and to compositions useful in such a process.

(2) Description of the prior art

Polyphosphates are used extensively for preventing scale and deposit formation in aqueous systems. The polyphosphates are added mainly for the reason that they are effective in sub-stoichiometric, so-called threshold amounts and that they are relatively inexpensive. It is, however, known that the polyphosphates are hydrolyzed in aqueous solutions under certain conditions. Thus the amounts of polyphosphates to be added are sometimes quite high and their effectiveness is frequently not fully satisfactory.

Recently phosphonic acids have become of ever increasing importance for use as complexing, sequestering compounds because they are stable in aqueous solution for an almost indefinite period of time and prevent scale and deposit formation in sub-stoichiometric amounts. They are added to aqueous systems mainly on account of their stability to hydrolysis. For this reason they are admixed, for instance, to cleaning and rinsing solutions in which they are stable for a prolonged period of time even under the most varied conditions of use and storage. The phosphonic acids, however, have the disadvantage that, in contrast to the polyphosphates, they are relatively expensive due to the costly starting materials used in their manufacture.

According to U.S. Pat. No. 3,354,094 starch degradation products, for instance, dextrins, obtained by roasting, i.e. by a heat treatment of starch in the absence of moisture at a temperature between 150° C. and 200° C., are capable of preventing or suppressing scale formation.

Furthermore it has been found that modified starch obtained on treating starch with acids or exposing it to the action of oxidizing agents below the glutinization temperature, has a satisfactory seeding or solubility inducing effect. Such modified starches are obtained thereby in solid form. They are insoluble in cold water and must be boiled in water before use in order to produce the required solutions. The preparation of such modified starch solutions by boiling in water, however, is rather complicated and frequently cannot be carried out by the users of such starch products for preventing scale formation.

It is also known from French Pat. No. 1,556,011 to add backing sirup containing dextrins to rinsing agents.

All these known compositions and processes, however, have disadvantages and/or are rather expensive.

SUMMARY OF THE INVENTION

It is one object of the present invention to provide a simple and highly effective process of preventing or suppressing scale formation in aqueous systems which process is free of the disadvantages of the heretofore used processes.

Another object of the present invention is to provide highly effective, rather inexpensive, scale formation preventing or suppressing compositions which are added to aqueous systems in sub-stoichiometric, i.e. seeding or solubility inducing amounts.

Still another object of the present invention is to provide scale formation preventing or suppressing acid, for alkaline cleaning or rinsing solutions which are useful, for instance, in bottle rinsing machines, for cleaning and rinsing milk cans, and for other cleaning and rinsing operations.

Other objects of the present invention and advantageous features thereof will become apparent as description proceeds.

According to the present invention a synergistic effect which far exceeds the effect of the scale formation preventing or suppressing agents when used each one separately, is achieved by adding to aqueous systems a composition consisting (a) of starch degradation products such as dextrins which are produced, for instance, by roasting starch in the absence of moisture at a temperature between 150° C. and 200° C., and/or by heating starch in aqueous mineral acid solutions at a temperature exceeding 50° C., and especially of starch degradation products which are readily soluble in water, and
(b) of amino alkylene phosphonic acids and/or hydroxy or amino alkane phosphonic acids wherein such starch degradation products and phosphonic acids are present in a proportion, by weight, between 1:1 and 50:1 and preferably between 2:1 and 20:1.

The concentration in which the two active agents according to the present invention are added to the aqueous systems may amount to 500 mg./l. of water and is preferably between 10 mg./l. and 30 mg./l. of water.

Dextrins which have proved to be useful for the purpose of the present invention are, for instance, the solid dextrins obtained by roasting starch as they are described in "Ullmanns Enzyklopaedie der technischen Chemie," 3rd edition, volume 16, pages 349 to 352; likewise the white dextrins obtained by heating starch in the absence of moisture to a temperature between 150° C. and 200° C., or the yellow dextrins produced on roasting starch which had been pretreated with a small amount of acid; or starch degradation products which are soluble in cold water. Such and other starch degradation products, i.e. dextrins are obtained, for instance, according to U.S. Pat. No. 3,354,094.

Especially useful starch degradation products can be produced by adding oxidizing agents to aqueous starch suspensions below the glutinization temperature and subsequently heating the mixture to a temperature not substantially exceeding 100° C. According to a modification of this process the oxidizing agent is added to the aqueous starch suspension at a temperature above the glutinization temperature, whereafter the mixture is kept at the reaction temperature until the starch has become soluble. If desired, the resulting aqueous solution is then evaporated to dryness. For instance, a 20% to 40% suspension of starch in water is prepared, the oxidizing agent is slowly added thereto at room temperature within half an hour to two hours while stirring, and the resulting mixture is then heated to a temperature between about 60° C. and about 100° C. for several hours.

One may also proceed by first causing glutinization of the starch by heating the starch suspension to a temperature above 50° C. whereafter the oxidizing agent is added to the glutinized starch suspension. Heating of the resulting mixture is continued until the starch has become soluble. When proceeding in this manner, it is advisable to start with a 5% to 15% starch suspension because otherwise the starch paste becomes too viscous and cannot be stirred properly at the time the oxidizing agent is added.

It is, of course, also possible first to add only part of the oxidizing agent at room temperature to the aqueous starch suspension and to admix the remainder during heating to a temperature above 50° C. or after said temperature has been reached.

Especially suitable oxidizing agents are alkali metal hypochlorites, such as sodium hypochlorite, or hydrogen peroxide. The oxidizing agents are preferably added in aqueous solution in amounts between about 1% to about 25% calculated for the starch.

Clear aqueous solutions of starch degradation products are obtained in this manner. These starch solutions are resistant to hydrolysis and can be stored for a prolonged period of time. They can be diluted with water and can be adjusted, as required, to acid, alkaline, or neutral reaction without disadvantageously affecting their properties and scale formation suppressing activity. It is also possible to isolate the active starch degradation products in solid form by either evaporating the aqueous solution in a vacuum to dryness or by passing it over a roller dryer. Thereby the active starch degradation product is obtained in the form of a porous material which can readily be pulverized and which is soluble in cold water without lump formation.

The dextrins according to the present invention can be produced from any kind of starch such as potato starch, corn starch, and others.

An especially high synergistic effect of compositions according to the present invention is achieved by using, in mixture with phosphonic acids, glucose sirups or starch sirups as they are described, for instance, in "Ullmanns Encyclopaedie der technischen Chemie," 3rd edition, volume 9, page 659. Such glucose sirups are produced by heating starch with water and a small amount of a mineral acid above the glutinization temperature. They are composed of a mixture of dextrin, glucose, and maltose. The content of reducing substance in said mixture expressed as dextrose units=DU (see "Ullmanns Encyclopaedie der technischen Chemie," 3rd edition, volume 16, page 326) can be greater or smaller depending upon the reaction conditions. Such glucose sirups are commercially available in the form of 80% sirups, calculated for its solids content. It is, of course, understood that such glucose sirups can be produced from any kind of starch, such as potato starch, corn starch, waxy cornstarch, and others. Preferably sirups of 20 to 60 dextrose units are used.

Phosphonic acids which are especially useful for the purpose of the present invention are amino alkylene phosphonic acids of the following formulas:

FORMULA I

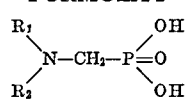

In said formula $R_1$ represents the group of the formula

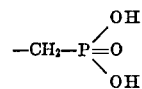

and
$R_2$ represents either
  (a) the group of the formula

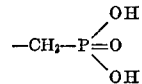

or
  (b) the group of the formula

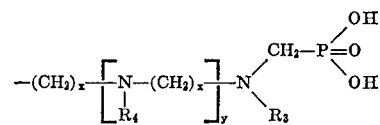

wherein $R_3$ and $R_4$
    (1) both represent the group of the formula

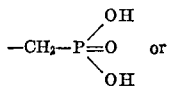 or (2) one of $R_3$ and $R_4$ is hydrogen and the other one is the group of the formula

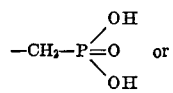 or (3) both are hydrogen; while $x$ is one of the numerals 2 and 3, and $y$ is one of the numerals from 0 to 4; or
  (c) the group of the formula

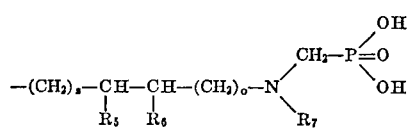

wherein
    $R_5$ is hydrogen or hydroxyl and
    $R_6$ is hydrogen or alkyl, preferably lower alkyl, such as methyl, and $R_5$ and $R_6$ together with the two carbon atoms to which they are attached, form a cycloalkyl ring, preferably with four, five, or six carbon atoms, such as cyclobutyl, cyclopentyl, or cyclohexyl; while
    $o$ and $z$ are one of the numerals 0 and 1 and
    $R_7$ is hydrogen or the group of the formula

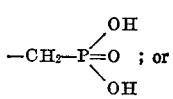 ; or (d) the group of the formula

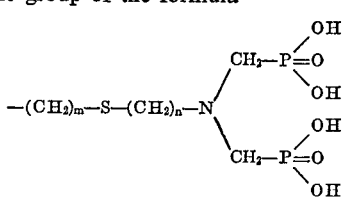

wherein $m$ and $n$ are the numerals 1 to 3.

Examples of amino alkylene phosphonic acids which have proved to be useful in the process according to the present invention are, for instance, amino tris-(methylene phosphonic acid);
diethylene triamino penta-(methylene phosphonic acid);
1,2- and 1,3-propylene diamino tetra-(methylene phosphonic acid);
ethylene diamino tetra-(methylene phosphonic acid);
dipropylene triamino penta-(methylene phosphonic acid);
1,3-diamino-2-propanol tetra-(methylene phosphonic acid);
1,2-bis-(amino methyl) cyclobutane tetra-(methylene phosphonic acid);
1,2-cyclohexane diamino tetra-(methylene phosphonic acid);
1-amino methyl cyclopentyl amino-(2)-tetra-(methylene phosphonic acid);
amino tris-(ethylidene phosphonic acid);
amino tris-(isopropylidene phosphonic acid);
diamino diethyl sulfide tetra-(methylene phosphonic acid);

and others.

Hydroxy or amino alkane diphosphonic acids of the following Formula II have also proved to be useful in the process according to the present invention:

FORMULA II

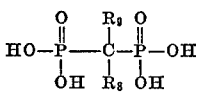

wherein $R_8$ is hydrogen, hydroxyl, an amino, lower alkylamino or di-lower alkylamino group, or lower alkyl with 1 to 8 carbon atoms, $R_9$ is hydrogen or lower alkyl with 1 to 10 carbon atoms which may be substituted by the group

Such compounds are, for instance, 1-hydroxy ethane-1,1-diphosphonic acid,
1-amino ethane-1,1-diphosphonic acid,
1-hydroxy ethane-1,1,2-triphosphonic acid, and others.

Mixtures of such phosphonic acids can, of course, also be used.

Acrylic acid and/or methacrylic acid polymers or copolymers of such acids with each other or with other polymerizable ethylenically unsaturated compounds can also be added to the above described compositions of dextrins and phosphonic acids. Polymers which have proved to be especially suitable additives to aqueous systems in combination with said amino alkylene phosphonic acids and dextrins for preventing scale and deposit formation are, for instance, polymerization products obtained by polymerization of acrylic acid or methacrylic acid, preferably of a molecular weight of at least 500;
copolymerization products of acrylic acid and methacrylic acid;
polymers obtained by copolymerization of acrylic acid and/or methacrylic acid with other polymerizable ethylenically unsaturated monomers such as crotonic acid, maleic acid or its anhydride, vinyl sulfonic acid, vinyl phosphonic acid, vinyl acetate, ethyl vinyl ether, acrylamide, ethyl acrylate, ethyl methacrylate, methacrylonitrile, and others.

The preferred polymerization products are those which are water soluble or at least readily dispersible in water.

Most effective copolymerization products of the above mentioned polymers are the graft polymers obtained by polymerization of acrylic acid and/or methacrylic acid, if desired, together with other copolymerizable ethylenically unsaturated monomers as mentioned hereinabove, in the presence of a polysaccharide.

Preferred polysaccharides are preformed water soluble polysaccharides and their derivatives, such as starches, for instance, potato starch, corn starch, and other starches, starch ethers, water soluble cellulose ethers, modified starches obtained by treating starch with acids or with oxidizing agents at a temperature below the gelatinization temperature, or starch degradation products which are soluble in cold water and are obtained by treating an aqueous starch suspension with an oxidizing agent at a temperature up to 100° C., or dextrins produced, for instance, by treating starch with acids followed by heating to a temperature above 150° C. or by roasting starch at 180° C. to 200° C.

Graft polymerization of acrylic acid, methacrylic acid and, if desired, other polymerizable ethylenically unsaturated monomers in the presence of said polysaccharides is preferably effected by heating in a water bath in 5% to 30% aqueous solution at 40° C. to 100° C. in the presence of a catalyst such as ammonium peroxydisulfate, mixtures of ammonium peroxydisulfate $(NH_4)_2S_2O_8$ and sodium pyrosulfite $Na_2S_2O_5$, or hydrogen peroxide.

Such three component compositions produce a highly advantageously synergistic, scale and deposit formation preventing and hardness stabilizing effect. Preferably such compositions consist of 2 to 4 parts, by weight, of dextrin or glucose sirup, 2 to 4 parts, by weight, of polymeric compound, and 1 part, by weight, of phosphonic acid.

As stated above, the combination of starch degradation products or dextrins, phosphonic acids and, if desired, acrylic acid and/or methacrylic acid polymers, copolymers, and graft polymers with polysaccharides according to the present invention are added to cleaning compositions as they are known to the art and especially to acidic or alkaline cleaning and rinsing fluids. Of particular advantage is the addition of such compositions to cleaning and rinsing fluids used in automatically operating bottle cleaning and rinsing machines or in cleaning tanks and other types of containers. In such cleaning operations scale and deposit formation takes place especially at the stage when the bottles, tanks, or containers are rinsed with fresh water, i.e. at that stage of the cleaning and rinsing process when only traces of the cleaning agent diluted with large amounts of rinsing water are present and are removed by rinsing. Such scale formation is prevented by the presence of small (seeding or threshold) amounts of the hardness stabilizing combination according to the present invention in the strongly diluted rinsing water. If necessary, small amounts of the combination according to the present invention may be added to the rinsing fluids for application to those zones of the aqueous system which are especially exposed to scale and deposit formation.

DESCRIPTION OF THE PREFERRED EMBODIMENTS

The synergistic effect of the agents according to the present invention which exceeds the additive effects of the components given separately is shown in the following tables in comparison with the threshold value of the components tested alone and not in combination with each other.

The threshold value was determined by adding to and dissolving in one liter of water of about 15° (German degrees of hardness), placed in a glass beaker, 12 g. of sodium hydroxide and a predetermined amount, in mg., of the compound or, respectively, the mixture of compounds to be tested. The beaker was covered with a watch glass and was allowed to stand at room temperature. It was then observed and noted after how many days a glass rod placed into the beaker and/or the walls of the beaker showed formation and deposition of crystals thereon.

0 in the following tables indicates that no crystals, i.e. incrustations, are deposited on the glass rod and/or the wall of the beaker, while
— indicates deposit formation.

TABLE I.—THRESHOLD EFFECT OF STARCH DEGRADATION PRODUCTS
(Component A)

| Component A | Amount added in mg. | Crystals deposited after x days |||||||| 
|---|---|---|---|---|---|---|---|---|---|
| | | 1 | 2 | 3 | 4 | 5 | 6 | 7 | 8 |
| I...... Glucose sirup from yellow corn starch with 52 DU. | 12.5 | — | — | — | — | — | — | — | — |
| II...... Glucose sirup from yellow corn starch with 40.6 DU. | 12.5 | — | — | — | — | — | — | — | — |
| III...... Glucose sirup from potato starch with 52.3 DU. | 12.5 | 0 | — | — | — | — | — | — | — |
| IV...... Glucose sirup from potato starch with 37.5 DU. | 12.5 | 0 | — | — | — | — | — | — | — |
| V...... Glucose sirup from waxy corn starch with 49.2 DU. | 12.5 | — | — | — | — | — | — | — | — |
| IV...... Glucose sirup from waxy corn starch with 38 DU. | 12.5 | 0 | — | — | — | — | — | — | — |
| VII...... Glucose sirup with 32 DU........ | 12.5 | 0 | — | — | — | — | — | — | — |
| VIII...... White dextrin obtained by roasting starch. | 12.5 | 0 | — | — | — | — | — | — | — |
| IX...... Yellow dextrin obtained by roasting starch. | 12.5 | — | — | — | — | — | — | — | — |

TABLE II.—SEEDING EFFECT OF THE PHOSPHONIC ACID
(Component B)

| Component B | Amount added in mg. | Standing for (days)— |||||
|---|---|---|---|---|---|---|
| | | 1 | 2 | 3 | 4 | 5 |
| I...... Diethylene triamino penta-(methylene phosphonic acid). | 2.5 | 0 | — | — | — | — |
| II...... Nitrilo tris-(methylene phosphonic acid). | 2.5 | 0 | — | — | — | — |
| III...... Ethylene diamino tetra-(methylene phosphonic acid). | 2.5 | 0 | — | — | — | — |
| IV...... 1-hydroxy ethane-1,1-diphosphonic acid. | 5 | 0 | — | — | — | — |

TABLE III.—SEEDING EFFECT OF MIXTURES OF STARCH DEGRADATION PRODUCTS AND PHOSPHONIC ACIDS

| Components A and B of the mixture | Amounts added in mg. || Standing for (days)— ||||||||||||
|---|---|---|---|---|---|---|---|---|---|---|---|---|---|
| | (A) | (B) | 1 | 2 | 3 | 4 | 5 | 6 | 7 | 8 | 9 | 10 | 11 | 12 |
| AII + BII | 7.5 | 2.5 | 0 | 0 | 0 | 0 | 0 | 0 | 0 | 0 | = | — | — | — |
| AII + BIV | 10 | 5 | 0 | 0 | 0 | 0 | 0 | 0 | 0 | 0 | — | — | — | — |
| AI + BIII | 10 | 2.5 | 0 | 0 | 0 | 0 | 0 | 0 | 0 | 0 | 0 | — | — | — |
| AIII + BI | 7.5 | 2.5 | 0 | 0 | 0 | 0 | 0 | 0 | 0 | 0 | 0 | — | — | — |
| AIV + BII | 7.5 | 2.5 | 0 | 0 | 0 | 0 | 0 | 0 | 0 | 0 | — | — | — | — |
| AV + BII | 10 | 2.5 | 0 | 0 | 0 | 0 | 0 | 0 | 0 | 0 | 0 | 0 | — | — |
| AVI + BI | 10 | 2.5 | 0 | 0 | 0 | 0 | 0 | 0 | 0 | 0 | 0 | — | — | — |
| AVII + BIV | 10 | 2.5 | 0 | 0 | 0 | 0 | 0 | 0 | 0 | 0 | — | — | — | — |
| AVII + BII | 10 | 2.5 | 0 | 0 | 0 | 0 | 0 | 0 | 0 | 0 | — | — | — | — |
| AVII + BI | 10 | 2.5 | 0 | 0 | 0 | 0 | 0 | 0 | 0 | 0 | — | — | — | — |
| AVII + BII | 7.5 | 2.5 | 0 | 0 | 0 | 0 | 0 | 0 | 0 | 0 | — | — | — | — |
| AVIII + BII | 10 | 2.5 | 0 | 0 | 0 | 0 | 0 | 0 | 0 | — | — | — | — | — |
| AIX + BIII | 10 | 2.5 | 0 | 0 | 0 | 0 | 0 | 0 | 0 | — | — | — | — | — |

TABLE IV.—SEEDING EFFECT OF THE POLYMERS
(Component C)

| Component C | Amount added in mg. | Standing for (days)— |||||
|---|---|---|---|---|---|---|
| | | 1 | 2 | 3 | 4 | 5 |
| I...... Polyacrylic acid............ | 10 | — | — | — | — | — |
| II...... Polymethacrylic acid........ | 10 | 0 | — | — | — | — |
| III...... Copolymerization product of acrylic acid and methacrylic acid 5:1. | 10 | — | — | — | — | — |

TABLE V.—SEEDING EFFECT OF A COMBINATION OF THE THREE COMPONENTS
A=starch degradation product plus B=phosphonic acid plus C=polymer

| Components A + B + C | Amounts added in mg. of— ||| Standing for (days)— |||||||
|---|---|---|---|---|---|---|---|---|---|---|
| | A | B | C | 2 | 4 | 6 | 8 | 10 | 12 | 14 |
| AI + BII + CI | 7.5 | 2.5 | 5 | 0 | 0 | 0 | 0 | 0 | — | — |
| AIII + BII + CI | 10 | 2.5 | 10 | 0 | 0 | 0 | 0 | 0 | 0 | 0 |
| AVIII + BII + CIII | 5 | 2.5 | 10 | 0 | 0 | 0 | 0 | 0 | 0 | 0 |
| AIII + BI + CII | 7.5 | 2.5 | 5 | 0 | 0 | 0 | 0 | 0 | — | — |

The following examples serve to illustrate the preparation of cold water-soluble starch degradation products without, however, being limited thereto.

Example 1

200 g. of an aqueous sodium hypochlorite solution containing 14.5% of reactive chlorine are slowly added drop by drop to a suspension of 300 g. of potato starch in 500 cc. of water at 20° C. to 30° C. within 2 hours while stirring. Thereafter, the starch suspension is heated to 90° C. to 100° C. Stirring at said temperature is continued for five more hours. A fluid solution of low viscosity containing 30% of the starch degradation product is obtained. Said solution is diluted to 20% by the addition of water.

Example 2

The solution obtained according to Example 1 is evaporated to dryness in a vacuum. The starch degradation product is obtained in the form of a porous powder which is readily soluble in cold water without formation of lumps.

Example 3

150 g. of potato starch are suspended in 250 cc. of water. 160 g. of an aqueous sodium hypochlorite solution containing 14.5% of reactive chlorine are added drop by drop to the suspension within thirty minutes. The reaction mixture is then heated in a water bath to 60° C. and stirring at said temperature is continued for three more hours. Thereafter the mixture is heated briefly to 90° C. to 100° C. The resulting solution is added to aqueous systems for preventing scale formation.

Example 4

A suspension of 100 g. of corn starch in 900 cc. of water is slowly heated in a water bath to 60–70° C. while stirring. 66 g. of an aqueous sodium hypochlorite solution containing 14.5% of reactive chlorine are added drop by drop to the resulting starch paste. Stirring at 90–100° C. is continued for three more hours. A clear solution with a satisfactory seeding, i.e. solubility initiating effect is obtained.

Example 5

150 g. of potato starch are suspended in 250 cc. of water while stirring. 200 g. of an aqueous sodium hypochlorite solution containing 14.5% of reactive chlorine are slowly added drop by drop at 20–30° C. to the starch suspension while stirring. Thereafter, the suspension is heated to 100° C. and stirring at said temperature is continued for three more hours. A clear solution of low viscosity is obtained. Said solution can be stored for a prolonged period of time and has a satisfactory solubility initiating, i.e. seeding effect.

Example 6

50 g. of a 15% hydrogen peroxide solution are slowly added drop by drop at 20–30° C. to a suspension of 150 g. of potato starch in 250 cc. of water. The suspension is then heated in a water bath to 80–90° C. Stirring at said temperature is continued for two more hours. The resulting solution has a good seeding, i.e. solubility initiating effect.

Example 7

300 g. of potato starch are suspended in 500 cc. of water. 200 g. of a 15% hydrogen peroxide solution are added drop by drop at room temperature to said suspension. The reaction mixture is then heated to 60° C. and stirring at said temperature is continued for 3 more hours. The resulting solution is evaporated to dryness in a vacuum. A brownish, porous powder which is readily soluble in cold water is obtained.

EXAMPLE 8

300 g. of corn starch are suspended in 500 cc. of water. 200 g. of a 15% hydrogen peroxide solution are added drop by drop to the suspension while stirring. The suspension is then heated to 100° C. and stirring at said temperature is continued for two more hours. After evaporating the resulting solution to dryness, a brownish powder which dissolves readily in cold water without lump formation, is obtained.

In place of potato starch and corn starch as used in the preceding examples, there may be employed as starting materials other types of starch such as wheat starch, rice starch, tapioca starch, sago starch, waxy corn starch, and others.

The starch degradation products obtained in this manner can be used for the purpose of the present invention in the form of their aqueous solutions but they can also be added in solid form to the aqueous systems to be treated.

These starch degradation products exhibit a certain capability of masking, i.e. combining and sequestering polyvalent cations, especially alkaline earth metal ions. Thus they can be employed in all instances involving the elimination of undesired and interfering metal ions in aqueous media such as calcium, magnesium, iron, and other ions. For this reason they represent also useful additives to detergents and cleaning compositions in solid or liquid form and can be used in various textile finishing processes.

The amounts of such starch degradation products when added to hard water in order to prevent or suppress scale formation, may be up to 500 mg./l. of water. Preferably their concentration is between about 10 mg./l. and about 30 mg./l. of water.

The hardness reducing or suppressing effect of such starch degradation products according to the present invention can also be improved by using them in mixture with phosphonic acids. The proportions, by weight, of starch degradation product to amino alkylene phosphonic acid may vary betwen about 1:1 and about 50:1 and is preferably between about 4:1 and about 20:1. The amounts of such mixtures added to one liter of water may be up to 500 mg. and are preferably between about 10 mg. and about 30 mg. A synergistic scale formation suppressing effect which exceeds the additive effect of the two agents, is achieved thereby.

The seeding, i.e. the solubility initiating effect of such starch degradation products and especially the synergistic effect of the combination of such starch degration products and phosphonic acids will be demonstrated in the following Tables 6, 7, and 8.

TABLE VI.—SEEDING EFFECT OF STARCH DEGRADATION PRODUCTS

| Compound | Amount added in mg. | Standing for (days)— | | | | | | |
|---|---|---|---|---|---|---|---|---|
| | | 2 | 4 | 6 | 8 | 10 | 12 | 14 |
| Starch degradation product according to Example 1. | 12 | 0 | 0 | 0 | 0 | — | — | — |
| | 20 | 0 | 0 | 0 | 0 | 0 | 0 | — |
| Starch degradation product according to Example 2. | 10 | 0 | 0 | 0 | 0 | — | — | — |
| | 20 | 0 | 0 | 0 | 0 | 0 | 0 | — |
| Starch degradation product according to Example 3. | 10 | 0 | 0 | 0 | 0 | — | — | — |
| | 20 | 0 | 0 | 0 | 0 | 0 | 0 | 0 |
| Starch degradation product according to Example 4. | 10 | 0 | 0 | 0 | 0 | — | — | — |
| | 20 | 0 | 0 | 0 | 0 | 0 | — | — |
| Starch degradation product according to Example 5. | 12.5 | 0 | 0 | 0 | 0 | 0 | — | — |
| | 20 | 0 | 0 | 0 | 0 | 0 | — | — |
| Starch degradation product according to Example 6. | 12.5 | 0 | 0 | 0 | 0 | 0 | — | — |
| | 20 | 0 | 0 | 0 | 0 | 0 | 0 | — |
| Starch degradation product according to Example 7. | 10 | 0 | 0 | 0 | 0 | — | — | — |
| | 20 | 0 | 0 | 0 | 0 | 0 | 0 | — |
| Starch degradation product according to Example 8. | 10 | 0 | 0 | 0 | 0 | — | — | — |
| | 20 | 0 | 0 | 0 | 0 | 0 | — | — |
| Untreated potato starch | 30 | — | — | — | — | — | — | — |

TABLE VII.—SEEDING EFFECT OF AMINO ALKYLENE PHOSPHONIC ACID

| Compound | Amount added in mg. | Standing for (days)— | | | | |
|---|---|---|---|---|---|---|
| | | 1 | 2 | 3 | 4 | 5 |
| Diethylene triamino penta-(methylene phosphonic acid)=DETPMP. | 2.5 | 0 | 0 | — | — | — |
| Ethylene diamino tetra(methylene phosphonic acid)=EDTMP. | 2.5 | 0 | — | — | — | — |
| Amino tris-(methylene phosphonic acid)=ATMP. | 2.5 | — | — | — | — | — |

TABLE VIII.—SEEDING EFFECT OF MIXTURES OF STARCH DEGRADATION PRODUCTS AND AMINO ALKYLENE PHOSPHONIC ACIDS

| Components of the mixture | Amounts added in mg. | Standing for (days)— | | | | | | |
|---|---|---|---|---|---|---|---|---|
| | | 2 | 4 | 6 | 8 | 10 | 12 | 14 |
| Starch degradation product according to: | | | | | | | | |
| Example 1 plus DETPMP | 10 plus 2.5 | 0 | 0 | 0 | 0 | 0 | 0 | 0 |
| Example 1 plus EDTMP | 11.25 plus 1.25 | 0 | 0 | 0 | 0 | 0 | 0 | — |
| Example 1 plus ATMP | 10 plus 2.5 | 0 | 0 | 0 | 0 | 0 | 0 | — |
| Example 2 plus EDTMP | 10 plus 2.5 | 0 | 0 | 0 | 0 | 0 | 0 | 0 |
| Example 3 plus DETPMP | 8 plus 2 | 0 | 0 | 0 | 0 | 0 | 0 | — |
| Example 3 plus EDTMP | 10 plus 2 | 0 | 0 | 0 | 0 | 0 | 0 | 0 |
| Example 8 plus EDTMP | 10 plus 2.5 | 0 | 0 | 0 | 0 | 0 | 0 | — |
| Example 8 plus DETPMP | 10 plus 2.5 | 0 | 0 | 0 | 0 | 0 | 0 | — |

The tested compounds and mixtures as mentioned in the preceding Tables I to VIII exhibit the same excellent scale formation suppressing effect at the pH-value of the water, i.e. without addition of alkali metal hydroxide. The foregoing tests, however, were carried out at an alkaline pH-value in order to demonstrate the advantageous effect of the compositions according to the present invention in such an alkaline medium as it is encountered in many rinsing and cleaning operations and preparations.

As stated above and is evident from Tables III, V, and VIII, the combinations of starch degradation products and phosphonic acids or of starch degradation products, phosphonic acids, and polymers have a considerably better effect than the components when added alone, said effect exceeding the additive effect of the components.

Addition of the compounds according to the present invention or their mixtures to acid or alkaline cleaning solutions have proved particularly useful. It is especially advantageous to use said compounds and mixtures, for instance, in automatically operating bottle rinsing machines or for cleaning tanks or containers. In such operations scale formation takes place quite readily especially at the stage whereby the bottles, tanks, or containers are subsequently rinsed with fresh water, i.e. at that stage of the rinsing and cleaning process when only traces of the cleaning agent diluted with large amounts of water are present and are washed out thereby. Such scale formation is prevented by the presence of smallest (seeding or solubility initiating) amounts of the compounds according to this invention in the highly diluted rinsing water. If necessary, small amounts of the compounds according to the present invention may be added to the rinsing solutions for application to those zones which are especially exposed to scale formation.

The following examples describe suitable cleaning and rinsing solutions according to the present invention without, however, being limited thereto.

Example 9

The composition contains 40% of acid phosphoric acid alkyl esters with 2 to 3 carbon atoms in the alkyl ester group, 20% of a mixture of the starch degradation product of Example 1 and diethylene triamino penta-(methylene phosphonic acid) (10:2.5), 10% of the antifoaming agent Pluronic L 21 (Wyandotte) and 30% of water.

0.3% of said composition are added to an aqueous 1% sodium hydroxide solution. The resulting cleaning solution is an excellent bottle rinsing solution.

Example 10

The composition contains 50% of an aqueous 67% gluconic acid solution, 20% of the starch degradation product of Example 3 and 30% of water.

0.2% of said mixture are added to an aqueous 1% sodium hydroxide solution to yield a highly effective bottle rinsing solution.

Example 11

The composition contains 35% of sodium silicate, 3% of the starch degradation product of Example 6, 20% of sodium carbonate, 17% of sodium hydroxide, 5% of the wetting agent Arkopal N/O 60 (Hoechst), 10% of sodium sulfate, and 10% trisodium orthophosphate.

1% aqueous solutions of said composition are advantageously used for cleaning and rinsing milk cans.

Example 12

The composition contains 40% of tripolyphosphate, 10% of the starch degradation product of Example 8, 5% of the antifoaming agent "Pluronic L 21" (Wyandotte), 10% of trisodium orthophosphate, and 35% of sodium gluconate.

0.2% of said composition are added to 1.5% aqueous sodium hydroxide solution. The resulting solution has proved useful for cleaning and rinsing of bottles and especially for cleaning bottles provided with labels and/or caps made of aluminum.

Example 13

The composition contains 40% of a mixture of phosphoric acid mono- and dimethyl ester, 20% of a mixture of glucose sirup obtained from yellow corn starch with 52 DU and of nitrilo tris-(methylene phosphonic acid) in the proportion of 4:1, and 40% of water.

0.3% of said composition are added to an aqueous 1% sodium hydroxide solution. The resulting cleaning solution is an excellent bottle rinsing solution.

Example 14

The composition contains 40% of the acid methyl isopropyl ester of phosphoric acid, 20% of a mixture of glucose sirup obtained from waxy corn starch with 38 DU and diethylene triamino penta-(methylene phosphonic acid) in the proportion of 3:1, and 40% of water.

0.2% of said mixture are dissolved in a 1% sodium hydroxide solution. The resulting solution is used for rinsing bottles.

Example 15

The composition contains 70% of a 67% gluconic acid solution, 20% of a mixture of glucose sirup obtained from potato starch with 32 DU and nitrilo tris-(methylene phosphonic acid) in the proportion of 3:1, and 10% of water.

0.2% of said mixture are dissolved in 1% sodium hydroxide solution. The solution is a highly effective bottle rinsing solution.

Example 16

The comopsition contains 35% of sodium silicate, 3% of a mixture of glucose sirup obtained from potato starch with 37 DU and ethylene diamino tetra-(methylene phosphonic acid) in the proportion of 4:1, 20% of sodium carbonate, 17% of sodium hydroxide, 5% of a wetting agent, 10% of sodium sulfate, and 10% of trisodium orthophosphate.

1% solutions of said mixture in water are used for cleaning milk cans.

Suitable acrylic acid or methacrylic acid polymers and copolymers are produced, for instance, according to the following examples without, however, being limited thereto.

Example 17.—Polyacrylic acid

A solution of 19.2 g. of ammonium persulfate in 1120 cc. of water is heated on a boiling water bath. 480 g. of monomeric acrylic acid are added thereto drop by drop within 30 minutes while stirring. Heating of the mixture is continued for one hour and the mixture is then cooled. The resulting solution can be added as such to the mixtures of starch degradation products and phosphonic acids of the preceding examples.

Example 18.—Polymethacrylic acid

A solution of 19.2 g. of ammonium persulfate in 1120 cc. of water is heated on a boiling water bath. 480 g. of methacrylic acid are added thereto within 20 minutes, while stirring. Subsequently the mixture is heated for one more hour and is then cooled. It is directly used as described in Example 17.

Example 19.—Copolymerization product of acrylic acid and methacrylic acid (5:1)

50 g. of monomeric acrylic acid and 10 g. of monomeric methacrylic acid are added drop by drop to a solution of 2.4 g. of ammonium persulfate in 240 cc. of water which has been heated on a boiling water bath, within about 20 minutes while stirring. Subsequently the mixture is heated on the boiling water bath for one more hour and is then cooled. The resulting solution is used as described in Example 17.

Example 20.—Copolymerization product of acrylic acid and ethyl vinyl ether (2:1)

A solution of 2.4 g. of ammonium persulfate and 140 cc. of water is heated on a boiling water bath. 40 g. of monomeric acrylic acid and 20 g. of ethyl vinyl ether are added drop by drop thereto within about two hours. Thereafter the mixture is heated for one more hour. The resulting solution is used as described in Example 17.

Example 21.—Copolymerization product of acrylic acid and maleic acid anhydride (2:1)

57.6 g. of ammonium persulfate in 3360 cc. of water are heated in a boiling water bath. A solution of 480 g. of maleic acid anhydride and 960 g. of acrylic acid which solution has been gently heated, is added thereto within about 2 hours. The mixture is heated for two more hours. The solution is directly used as described in Example 17.

Example 22.—Copolymerization product of acrylic acid and of the sodium salt of vinyl sulfonic acid (2:1)

2.4 g. of ammonium persulfate are dissolved in 140 cc. of water while heating in a boiling water bath. A mixture of 40 g. of acrylic acid and 40 g. of the sodium salt of vinyl sulfonic acid (50% aqueous solution) is added thereto within about two hours. Subsequently the mixture is heated for one more hour and is then cooled and used as described in Example 17.

Example 23.—Copolymerization product of acrylic acid and acrylic acid ethyl ester (5:1)

A solution of 2.4 g. of ammonium persulfate and 140 cc. of water is heated on a boiling water bath. A mixture of 50 g. of acrylic acid and 10 g. of acrylic acid ethyl ester is added thereto within about two hours. Subsequently the mixture is heated for one more hour. The resulting solution is used as described in Example 17.

Example 24.—Copolymerization product of acrylic acid and vinyl acetate (3:1)

19.2 g. of ammonium persulfate are heated in 1120 cc. of water on a boiling water bath. A mixture of 160 g. of vinyl acetate and 320 g. of acrylic acid is added thereto within about two hours. Subsequently the mixture is heated for one more hour. After cooling, the resulting solution is used for the purpose of the present invention as described in Example 17.

The terms "seeding amounts," "solubility inducing amounts," "sub-stoichiometric amount," "sub-sequestering amounts," "solubility initiating amounts" are used in the foregoing description of the invention and in the claims in order to designate amounts of the scale formation suppressing agents which are lower than required to stoichiometrically combine with the scale and hardness forming compounds of the aqueous systems to be treated. Such amounts may also be designated as "threshold amounts."

The term "glutinization temperature" as used in the foregoing description and in the claims indicates the temperature at which gelatinization of the starch takes place. The "glutinization temperature," i.e. the gelatinization temperature of potato starch is, for instance, 61.5° C., that of corn starch 68.5° C., that of rice starch 75° C., that of wheat starch 65° C. The highest temperature to be used in the production of starch degradation products with oxidizing agents is about 100° C., the preferred temperatures are temperatures between about 80° C. and about 95° C.

The antifoaming agent "Pluronic L 21" used in Examples 9 and 12 is a bulk copolymer of ethylene oxide and polypropylene glycol.

The wetting agent "Arkopal N/O 60" used in Example 11 is a nonylphenol polyglycol ether with 6 moles of ethylene oxide for one mole of nonylphenol.

Of course, other suitable antifoaming and wetting agents may also be used.

The term "starch degradation products" as used herein and in the claims defines such degradation products of starch which have been obtained by thermal, oxidative, or acid degradation or modification in order to improve their solubility, to lower the viscosity of their aqueous solutions, to increase their solubility in cold water, without completely hydrolyzing the starch to sugars. This term comprises among others the dextrins, the starch syrups, the modified starches as they are described, for instance, by Kirk-Othmer "Encyclopedia of Chemical Technology," second edition, vol. 18, under "Starch" and vol. 6 under "Dextrose and Starch Syrups" and in "Ullmanns Enzyklopaedie der technischen Chemie," 3rd edition, vol. 16 under "Staerke" and vol. 9 under "Kohlenhydrate."

We claim:

1. A composition for suppressing scale and deposit formation in aqueous systems, said composition containing, as scale and deposit formation suppressing agent, a mixture composed of
   (a) a starch degradation product selected from the group consisting of a dextrin produced by roasting starch and a glucose syrup, and
   (b) an alkylene phosphonic acid, the starch degradation product and the alkylene phosphonic acid being present in said mixture in the proportion, by weight, between about 2:1 and about 4:1.

2. The composition of claim 1, wherein the starch degradation product is a dextrin produced by roasting starch.

3. The composition of claim 1, wherein the starch degradation product is a dextrin produced by heating to a temperature exceeding 50° C. of starch in an aqueous mineral acid solution.

4. The composition of claim 1, wherein the starch degradation product is glucose sirup.

5. The composition of claim 1, wherein the starch degradation product is a yellow dextrin.

6. The composition of claim 1, wherein the starch degradation product is a white dextrin.

7. The composition of claim 1, wherein the alkylene phosphonic acid is an amino alkylene phosphonic acid.

8. The composition of claim 1, wherein the alkylene phosphonic acid is an alkylene phosphonic acid selected from the group consisting of diethylene triamino penta- (methylene phosphonic acid), ethylene diamino tetra-(methylene phosphonic acid), nitrilo tris-(methylene phosphonic acid), and 1-hydroxy ethane 1,1-diphosphonic acid, and mixtures thereof.

9. The composition of claim 1, additionally containing a polymer selected from the group consisting of a polymer of acrylic acid, a polymer of methacrylic acid, a copolymer of acrylic acid and methacrylic acid, a copolymer of acrylic acid and/or methacrylic acid with a polymerizable, ethylenically unsaturated compound, a graft polymer of a polysaccharide and said acrylic acid and/or methacrylic acid, and a graft polymer of a polysaccharide and said acrylic acid and/or methacrylic acid and a polymerizable, ethylenically unsaturated compound.

10. A cleaning fluid comprising an aqueous cleaning solution containing, as scale and deposit formation suppressing agent, a composition containing a mixture composed of
(a) a starch degradation product selected from the group consisting of a dextrin produced by roasting starch and a glucose syrup, and
(b) an alkylene phosphonic acid,
the starch degradation product and the alkylene phosphonic acid being present in said mixture in the proportion, by weight, between about 2:1 and about 4:1, said composition being present in said cleaning fluid in an amount between about 10 mg./l. and about 500 mg./l. of cleaning fluid.

11. The cleaning fluid of claim 10 containing the composition in said cleaning fluid in an amount between about 10 mg./l. and about 30 mg./l. of cleaning fluid.

12. The cleaning fluid of claim 10 wherein the aqueous cleaning solution is a dilute aqueous sodium hydroxide solution.

References Cited
UNITED STATES PATENTS

| | | | |
|---|---|---|---|
| 3,575,868 | 4/1971 | Galvin et al. | 252—181 |
| 3,354,094 | 11/1967 | Brink et al. | 252—180 |
| 3,596,766 | 8/1971 | Johnston et al. | 210—58 |
| 2,826,552 | 3/1958 | Bonewitz et al. | 252—156 |
| 3,082,173 | 3/1963 | Horvitz | 252—181 |
| 3,619,427 | 11/1971 | Kautsky | 210—58 |
| 3,620,974 | 11/1971 | Stanford et al. | 252—8.55 B |
| 3,677,956 | 7/1972 | Carlson | 252—180 |
| 3,477,956 | 11/1969 | Stanford et al. | 252—8.55 |
| 2,220,950 | 11/1940 | Bird | 210—23 |
| 2,382,262 | 8/1945 | Scherer et al. | 252—173 |
| 3,499,842 | 3/1970 | Carlson | 252—180 |
| 3,714,066 | 1/1973 | King et al. | 252—389 A |
| 3,714,067 | 1/1973 | King et al. | 252—389 A |

GEORGE F. LESMES, Primary Examiner

W. R. DIXON, Jr., Assistant Examiner

U.S. Cl. X.R.

252—181, 82, 86; 260—17.4 GC

UNITED STATES PATENT OFFICE
CERTIFICATE OF CORRECTION

PO-1050
(5/69)

Patent No. 3,791,978     Dated February 12, 1974

Inventor(s) Friedrich Krueger and Lieselotte Bauer

It is certified that error appears in the above-identified patent and that said Letters Patent are hereby corrected as shown below:

Column 2, line 30: Change " , for" to -- or --.
Column 2, line 35: Before "description" insert -- the --.

Signed and sealed this 4th day of June 1974.

(SEAL)
Attest:

EDWARD M. FLETCHER, JR.
Attesting Officer

C. MARSHALL DANN
Commissioner of Patents